(12) United States Patent
Horlander

(10) Patent No.: US 6,437,830 B1
(45) Date of Patent: Aug. 20, 2002

(54) SYSTEM AND DATA FORMAT FOR COMMUNICATING DATA BETWEEN A VIDEO DECODER AND A PERIPHERAL DEVICE

(75) Inventor: Karl Francis Horlander, Indianapolis, IN (US)

(73) Assignee: Thomson Licensing S.A., Boulogne Cedex (FR)

(*) Notice: Subject to any disclaimer, the term of this patent is extended or adjusted under 35 U.S.C. 154(b) by 0 days.

(21) Appl. No.: 09/454,398

(22) Filed: Dec. 3, 1999

Related U.S. Application Data

(60) Provisional application No. 60/136,456, filed on May 28, 1999.

(51) Int. Cl.[7] .............................. H04N 7/08; H04N 7/06; H04N 7/084; H04N 11/00; H04N 5/91
(52) U.S. Cl. ..................... 348/478; 348/473; 348/476; 348/479; 348/477; 348/460; 348/465; 386/94
(58) Field of Search ............................... 348/473, 478, 348/476, 477, 479, 460–461, 464, 465, 554, 558, 434.1, 435.1; 386/94, 104

(56) References Cited

U.S. PATENT DOCUMENTS

| | | | | |
|---|---|---|---|---|
| 4,866,770 A | * | 9/1989 | Seth-Smith et al. | 380/212 |
| 5,541,662 A | * | 7/1996 | Adams et al. | 348/460 |
| 5,612,900 A | * | 3/1997 | Azadegan et al. | 364/514 |
| 5,619,274 A | * | 4/1997 | Roop et al. | 348/461 |
| 5,659,368 A | * | 8/1997 | Landis | 348/467 |
| 5,703,795 A | | 12/1997 | Mankovitz | |
| 5,822,019 A | * | 10/1998 | Takeuchi | 348/722 |
| 5,822,425 A | * | 10/1998 | Ezaki et al. | 386/94 |
| 5,907,366 A | * | 5/1999 | Farmer et al. | 348/478 |
| 5,910,825 A | * | 6/1999 | Takeuchi | 348/722 |
| 5,963,265 A | * | 10/1999 | Bae et al. | 348/465 |
| 6,037,932 A | * | 3/2000 | Feinleib | 345/327 |
| 6,282,366 B1 | * | 8/2001 | Oguro et al. | 386/104 |

OTHER PUBLICATIONS

International Standard, CEI IEC 61880, 1998, *Video Systems (525/60)—Video and Accompanied Data Using the Vertical Blanking Interval.*
EIAJ CPR–1204–1 Japan, Technical Report of Electronic Industries Association of Japan, *Transfer Method of Video ID Information Using Vertical Blanking Interval*, 9 pages.

* cited by examiner

*Primary Examiner*—John Miller
*Assistant Examiner*—Paulos M. Natnael
(74) *Attorney, Agent, or Firm*—J. S. Tripoli; R. H. Kurdyla; J. M. Navon

(57) ABSTRACT

A communication data format conveys digital ancillary data in a vertical blanking interval of a video signal. The format employs a reference symbol including a plurality of digital pulses for indicating the start of the ancillary data and also includes a header byte following the reference symbol. The header byte contains an identifier identifying a destination service for a payload of the ancillary data or an address identifying a destination of the payload. The format also conveys multiple payload bytes, following the reference symbol in which individual bits have a period substantially comprising, a first integral multiple of a first clock period associated with a first data format, and a different second integral multiple of a second clock period associated with a second data format.

19 Claims, 4 Drawing Sheets

SYSTEM AND DATA FORMAT FOR COMMUNICATING DATA BETWEEN A VIDEO DECODER AND A PERIPHERAL DEVICE

This is a non-provisional application of provisional application Ser. No. 60/136,456 by K. F. Horlander, filed May 28, 1999.

FIELD OF THE INVENTION

The present invention relates to the encoding and decoding of data in a particular data format for incorporation in a Vertical Blanking Interval (VBI) of an NTSC compatible (or other type) video signal, for example.

BACKGROUND OF THE INVENTION

A number of video encoding systems convey ancillary digital data (for captions, sub-text, control functions and other purposes) in a Vertical Blanking Interval (VBI) of an analog video signal such as an NTSC compatible (or other type) video signal, for example. These systems employ data formats with specific preliminary signals for use in synchronizing to the ancillary data. The data formats also use specific data bit widths, timing and other characteristics that affect the recovery of the ancillary data in a video receiver decoder. A data format defined by IEC 61880 (1998 edition) entitled "Video and accompanied data using the vertical blanking interval—Analogue interface", clause 3 defines a VBI data signal with a preliminary sinusoidal synchronizing signal and a two bit (a logic one followed by a logic zero) reference pulse sequence followed by twenty bits allocated for conveying data. Similarly, ELAJ CPR-1204-1 entitled "Transfer Method of Video ID information using Vertical Blanking Interval (525P system)" defines a VBI data signal that omits a preliminary sinusoidal synchronizing signal but incorporates a two bit (a one followed by a zero) reference pulse sequence followed by thirty bits allocated for conveying data. The characteristics of these (and other) known VBI data formats impose constraints on the operation of a video receiver for receiving and decoding ancillary data conveyed in the VBI portion of an analog video signal. Specifically, such constraints limit the flexibility of decoder operation and the ability of a decoder to adaptively operate in different modes for decoding input video signals encoded to different video standards.

The problems imposed by such constraints and derivative problems, are addressed by a system according to principles of the invention.

SUMMARY OF THE INVENTION

A communication data format conveys digital ancillary data in a vertical blanking interval of a video signal. The format employs a reference symbol including a plurality of digital pulses for indicating the start of the ancillary data and also includes a header byte following the reference symbol. The header byte contains an identifier identifying a destination service for a payload of the ancillary data or an address identifying a destination of the payload. The format also conveys multiple payload bytes, following the reference symbol in which individual bits have a period substantially comprising a first integral multiple of a first clock period associated with a first data format, and a different second integral multiple of a second clock period associated with a second data format.

DETAILED DESCRIPTION OF THE DRAWING

Figure 1:
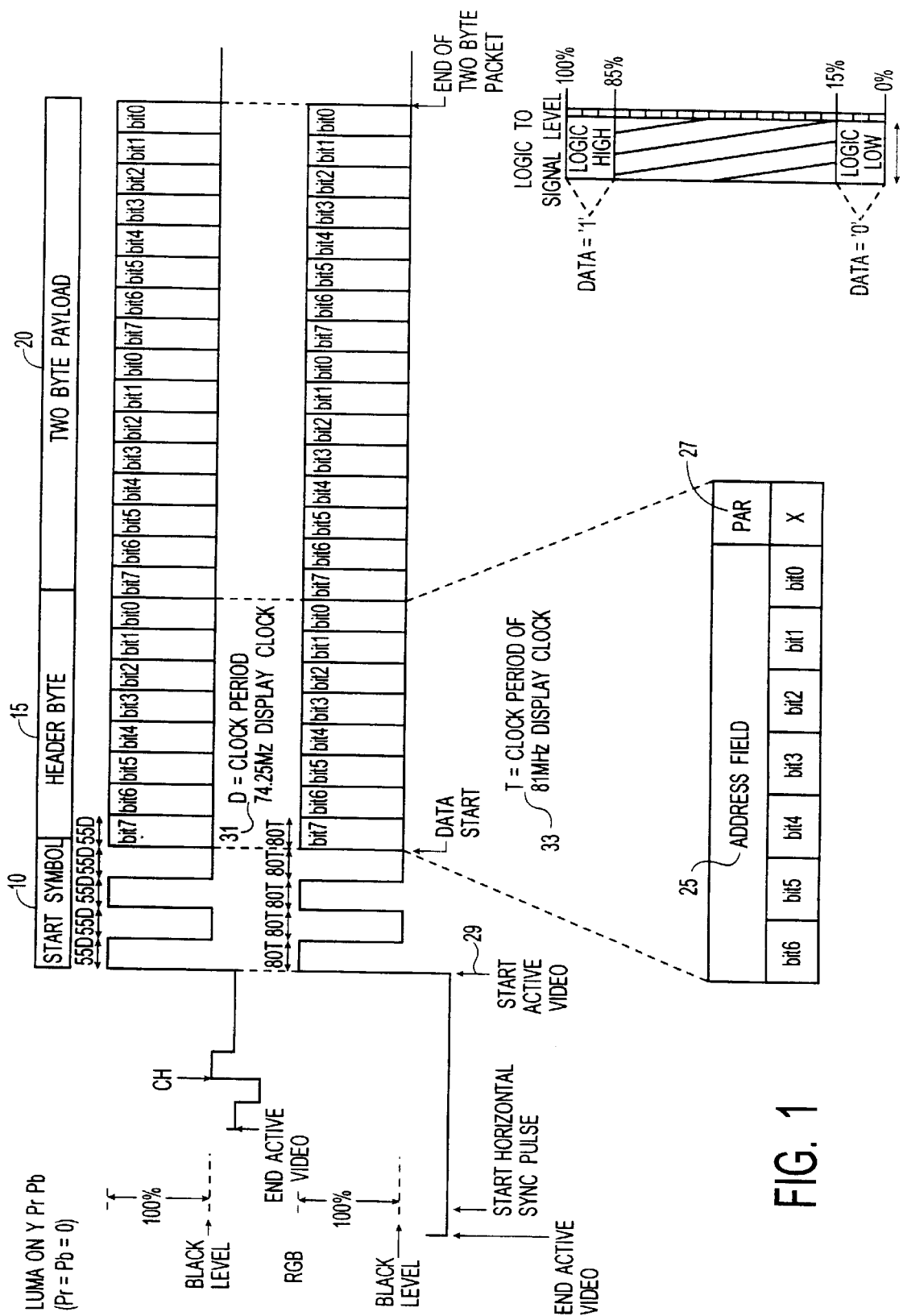
FIG. 1 shows a Vertical Blanking Interval (VBI) data format facilitating adaptive data recovery and decoder operation, according to invention principles.

FIG. 1 shows a Vertical Blanking Interval (VBI) data format facilitating adaptive data recovery and decoder operation. The data format advantageously facilitates adaptive decoder multiple mode operation in different data detection and recovery modes. The data format also advantageously employs a data bit period that accommodates data encoded using clock rates associated with different standards. Specifically, the data format of FIG. 1 employs a quadrature (i.e. a "1010" bit pattern) reference symbol start pulse (item 10 of FIG. 1) of half a byte duration that substantially starts at the start of active video of a horizontal video line (item 29 of FIG. 1). The use of such a quadrature reference symbol, defined to start at the beginning of active video, enables a decoder to detect and recover data by either of two different recovery methods. Such a data format enables a decoder to recover data either by, (a) pulse detection following synchronization to the quadrature reference symbol using a phase locked loop, for example, or (b) line-locked pulse detection, without prior phase locked loop synchronization, based on the known (active video) start time of the reference symbol following the horizontal sync pulse of the analog video signal. Further, the double pulse (i.e. 1010) bit pattern of reference symbol 10 offers improved phase lock loop synchronizing capability over a single pulse (i.e. 10) bit pattern as exemplified by the VBI data signal reference pulse sequence of the EIAJ CPR-1204-1 standard. This is because the reference symbol provides a detector circuit with a larger number of pulse edges for use in detection and synchronization in comparison to the single pulse reference symbol pattern.

The data format of FIG. 1 also employs a data bit period that accommodates data encoded using clock rates associated with different standards. Specifically, the bit period of the FIG. 1 data format is advantageously selected to comprise a first integral multiple of a first clock period associated with a first data format, and a different second integral multiple of a second clock period associated with a second data format. In the data format of FIG. 1 the ancillary data bit period is selected to be a multiple of, (a) 20 times the 27 MHz clock period associated with EIA 770.1 and EIA 770.2 video standards (and also associated with the MPEG system standard ISO 13818-1 section 2.5.2.1), and also a multiple of, (b) 55 times the 74.25 MHz clock period associated with the EIA 770.3 video standard (item 31 of FIG. 1). The resultant selected bit period of the FIG. 1 data format is approximately 741 nano-seconds in duration. In FIG. 1, the ancillary data bit period of item 33 comprises a multiple of 60 times an 81 MHz clock period which is used as a video clock in a number of digital video systems. Also, since the 81 MHz clock period is an integral multiple (i.e. a 3 times multiple) of a 27 MHz clock period the bit period of the FIG. 1 data format accommodates data encoded using 81 MHz, 27 MHz, and 74.25 MHz (and other integral multiple) clock rates associated with different standards.

The multi-standard compatible bit period of the data format of FIG. 1 enables ancillary data to be encoded by devices operating with clock frequencies associated with any one of a number of different standards e.g. with the 27 MHz clock frequency of the EIA 770.1, EIA 770.2 or MPEG standards or with the 74.25 MHz frequency of the EIA 770.3 standard. The resultant ancillary data, incorporated within an analog video signal VBI (and compatible with the format of FIG. 1), is recoverable and decodable by a decoder without the need to know the standard employed by the originating device.

The features of the FIG. 1 data format facilitate adaptive data recovery by either, (a) phase locked loop synchronized pulse detection and (b) line-locked pulse detection independent of phase locked loop synchronization. These features also facilitate the adaptive decoding of ancillary data provided by devices operating using different video coding standards (e.g. EIA 770.1, EIA 770.2, EIA 770.3 or MPEG standards). Further, the combination of quadrature reference symbol and multi-standard compatible bit period provides significant flexibility, adaptability and simplicity advantages for inter-device communication between cost sensitive consumer devices such as televisions (including analog, digital and high definition TV (HDTV)), VCRs, digital video disk (DVD) players and set top boxes etc.

The FIG. 1 data format supports communication of multiple data types and services including, captions, conditional access information, copy protection data, configuration information, display format/standard identification data, descriptive data and control information. This information is conveyed in the ancillary data format of FIG. 1 on a horizontal line in the VBI e.g. on line 42 of a 2 H display system (a display system using substantially twice the NTSC horizontal line rate). Alternatively, it may be incorporated on this line or another line in a 1 H or 2.14 H or other line rate system. The ancillary data format includes a header byte (item 15 of FIG. 1) that identifies a destination service for a payload of the ancillary data or an address identifying a destination of the payload. The address comprises 7 bits (item 25) and a single parity bit (item 27). The parity bit in the address header enables error detection to be performed on individual header bytes. The address bits (item 25) may comprise a service identifier e.g. identifying payload data as being caption, configuration, display format, video standard, conditional access, copy protection, description or other control information. Alternatively, the address bits may comprise another identifier associated with the payload data and the parity bit may be omitted.

The ancillary data format also includes two payload bytes (item 20 of FIG. 1) as may be used for EIA770.3 standard communication, for example. In other embodiments, the data format structure may include different numbers of header and payload bytes. The header address or service identifier (item 15) is associated with the two byte payload (item 20). One or more of the payload data bits may also be allocated as a parity bit for use in detecting payload errors in individual payload data segments (e.g. for individual bytes or for both bytes together). The payload data may also be used to transport larger messages in multiple video frames conveyed in multiples of two byte segments. For this purpose, the header (or payload in another embodiment) includes information that indicates a message is being sent in multiple horizontal line ancillary data segments and that may also enable the segments to be assembled into a single message. Further, an error detection and/or correction code may be conveyed with the payload data to validate and correct messages.

Figure 2:
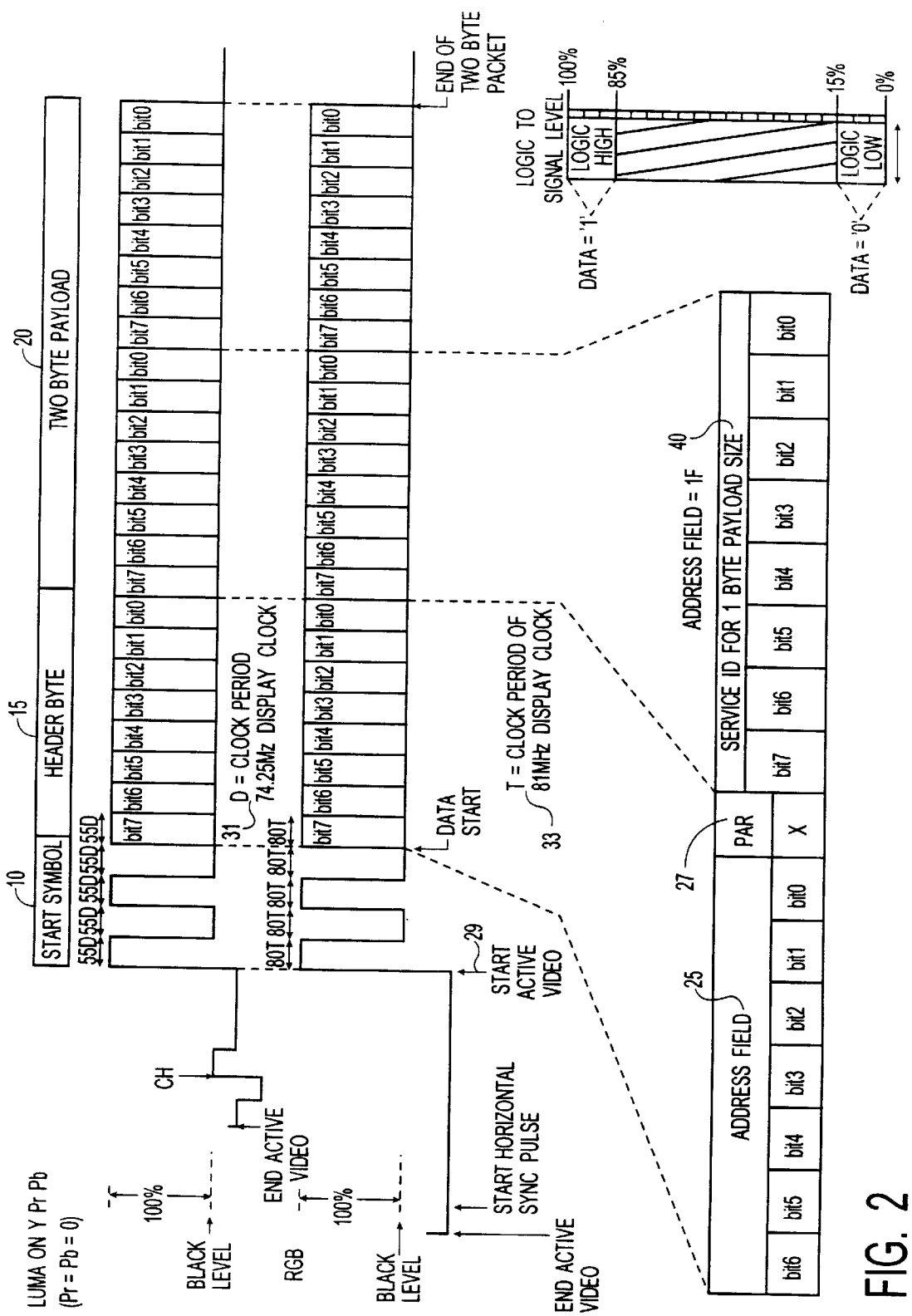
FIG. 2 shows the Vertical Blanking Interval (VBI) data format of FIG. 1 incorporating a particular configuration of header and payload data, according to invention principles.

FIG. 2 shows the Vertical Blanking Interval (VBI) data format of FIG. 1 incorporating a particular configuration of header and payload data. FIG. 2 shows a single byte payload as may be used for EIA770.3 standard communication, for example. In FIG. 2, the first payload byte is allocated to be a service identifier (item 40). Consequently, both an address (item 15) and a service identifier (item 40) are associated with a single byte payload (the remaining byte of item 20). As a result, the payload data may be flexibly processed by different devices for different functions. Alternatively, both the header byte (item 15) and one byte of the payload (item 20) may be used to provide a single 16 bit address or service identifier. Thereby extending the range of identifiers and addresses that may be used.

The ancillary data is encoded on luminance information (Y) in a Y Pr Pb luminance-chrominance format video signal. The ancillary data may also be identically encoded on each of the color signals in an RGB format video signal or may be conveyed on only or two of the color signals. Alternatively, each individual component signal of an RGB or Y Pr Pb format video signal may be used to convey different ancillary data. The ancillary data may be similarly conveyed in the component video signals of other format video signals.

Figure 3:
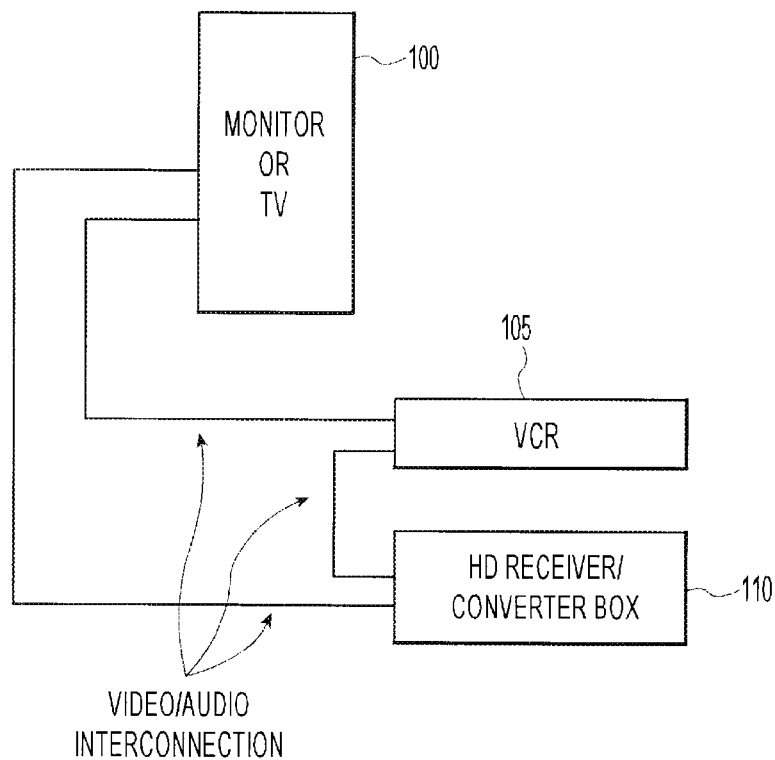
FIG. 3 shows a video system including a High Definition (HD) video decoder, a video monitor and a VCR employing the VBI ancillary data format of FIG. 1 for selecting decoder processing functions based on copy protection information, according to invention principles.

FIG. 3 shows a video system including a High Definition (HD) video decoder 110, a video monitor (e.g. TV) 100 and a VCR 105 employing the VBI ancillary data format of FIG. 1 for selecting decoder processing functions based on copy protection information. In other embodiments, decoder 110 and monitor 100 may be combined in a single unit. The copy protection information is compatible with a Copy Generation Management System (CGMS) document (including CGMSA—analog and CGMSD—digital versions) referenced in a proposed Video Home Recording Act of Mar. 14, 1996 intended for submission to the 104th Congress (as yet not submitted), but may alternatively conform to other formats. In the system of FIG. 3, the ancillary data format of FIG. 1 is used to adaptively convey and update copy protection configuration information for different video display formats and modes. Specifically, the ancillary data is used to provide different display and record privileges for different display formats or record modes. Such different display formats may include, for example, high definition TV (HDTV) or standard definition TV (SDTV) formats. The different recording modes may include, for example, modes involving recording text, captions, web pages, or Picture-in Picture (PIP) images associated with individual programs. The ancillary data format of FIG. 1 may also be used to communicate other control information between a decoder and a display or record device or between other devices for optimizing video and audio reproduction. Such additional control information may include audio control and program description data, parental ratings information and also date and time information. Thus, a simple monitor could look at this data and automatically optimize and configure its display and audio reproduction functions.

In the system of FIG. 3, video decoder 110 adaptively decodes and converts received broadcast high definition video data to provide either high definition (HD) digital MPEG compatible video data, standard definition (SD) digital MPEG compatible video data or an analog composite video signal for storage on VCR 105. Decoder 110 configures VCR 105 for both recording mode and copy protection processing modes using control and configuration information conveyed in the ancillary data (per the FIG. 1 format) in the VBI of the NTSC compatible composite video output by decoder 110. Note, the ancillary data in the composite video signal is advantageously used to configure VCR 105 in all recording modes e.g. in modes comprising recording a program in digital MPEG compatible HD signal format or digital MPEG compatible SD signal format or as an analog composite video signal.

In an exemplary recording mode, decoder 110 provides high definition MPEG compatible digital video data representing a program to VCR 105 for recording. Decoder 110 configures VCR 105 to record the high definition MPEG data it receives in high definition format using configuration data conveyed in ancillary data in the VBI of the NTSC compatible composite video output by decoder 110 to VCR 105. VCR 105 is a multi-function unit capable of converting between different video formats both for recording and upon playback. For this purpose, VCR 105 contains an upsampling interpolator for converting SD video data to HD video data and a downsampling interpolator for converting HD video data to SD video data. VCR 105 also contains MPEG decoding/encoding and analog to digital and digital to analog conversion and sampling functions to convert between digital HD and SD data and analog composite video data. VCR 105 selects a signal recording format and converts the input signal data (HD, SD or composite analog) to the desired format for recording, in response to configuration and copy protection information received from decoder 110. VCR 105 also blocks recording or playback of prohibited material in response to the copy protection information.

The signal format conversion capability of VCR 105 enables VCR 105 to adaptively select a signal format for recording or playback, in response to copy protection information received from decoder 110. Thereby, VCR 105 advantageously selects play back or recording modes (and associated display formats) as well as subsequent copying limitations (e.g. prohibiting subsequent copying, allowing one subsequent copy, or unlimited subsequent program copying) based on copy protection data reflecting User designated billing and conditional access options. As a result, a User may only be allowed to record a program in a particular format and to view a program on playback in a particular format based on the User's pre-selected billing options. Such a particular format may comprise, for example, one of the HD, SD or analog signal formats. Similarly, the copy protection data may allow time based limitations based on a User's pre-selected billing options. Such limitations may permit a User to view a program upon playback for a limited period e.g. 3 months only. In addition, the copy protection data may allow a combination of time based and signal format limitation allowing playback and display of a program for a specific period (e.g. 3 months) in one format (e.g. HD format) and another period (e.g. a subsequent year) in a different format (e.g. SD format), for example.

It is to be noted that in other embodiments VCR 105 may receive and process MPEG SD video data or an analog composite video signal for recording. Also, VCR 105 may include the capability of converting between different display formats including, a 1 H line rate format, a 2 H line rate format and a 2.14 H line rate format and other formats either for recording or upon playback. VCR 105 may also include the capability of providing a desired interlaced format (e.g. 1920×720 pixel resolution) or progressive format (e.g. 1920×720 pixel resolution) for recording operation or upon playback, by the use of additional sample rate converter interpolation functions. Further, the adaptive conversion and copy protection functions of VCR 105 may alternatively be located in a separate unit e.g. decoder 110 or in a single combined unit that includes the functions of both decoder 110 and VCR 105.

Figure 4:
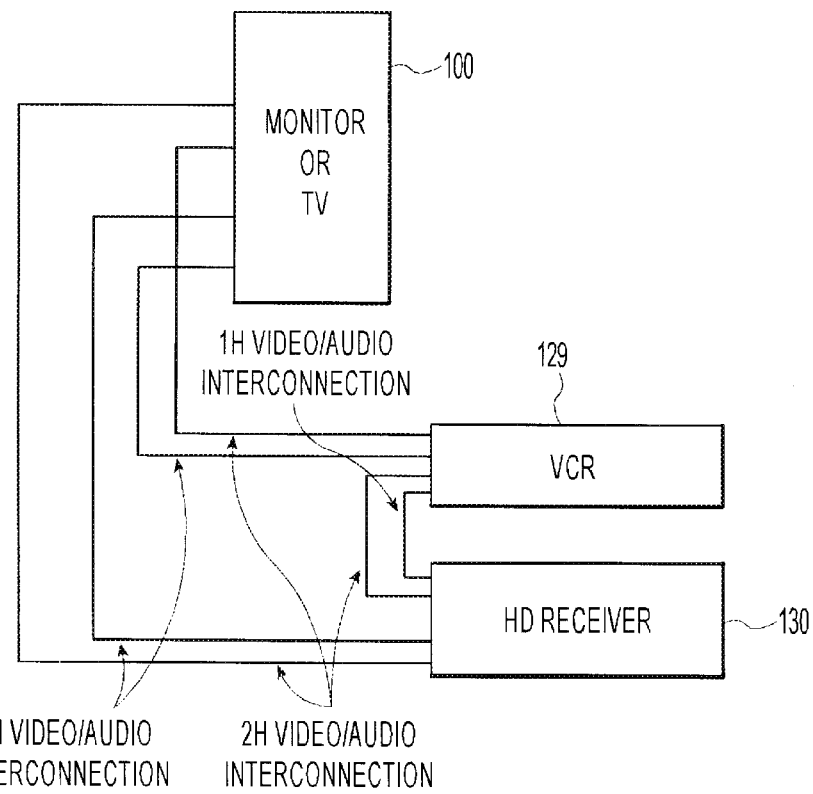
FIG. 4 shows a video system similar to the system of FIG. 3 employing the VBI ancillary data format of FIG. 1 for selecting further decoder configurations, according to invention principles.

FIG. 4 shows a video system similar to the system of FIG. 3 employing the VBI ancillary data format of FIG. 1 for selecting further decoder configurations. The FIG. 4 system includes High Definition (HD) video decoder 130, a video monitor (e.g. TV) 100 and a VCR 129 employing the VBI ancillary data format of FIG. 1 for selecting decoder processing functions based on copy protection information. Decoder 130 advantageously provides both 1 H and 2 H line rate format signals to VCR 129 and video monitor 100. This enables decoder 130 to configure VCR 129 using the ancillary data format of FIG. 1 (conveyed in the 1 H or 2 H composite signal VBI) to process either 1 H (e.g. NTSC format) or 2 H (e.g. 1920×1080 pixel resolution) video and audio formats. Further, VCR 129 includes the capability of converting between 1 H line rate format, a 2 H line rate format (or 2.14 H line rate format) either for recording or upon playback. Alternatively, this conversion may be performed within decoder 130.

Figure 5:
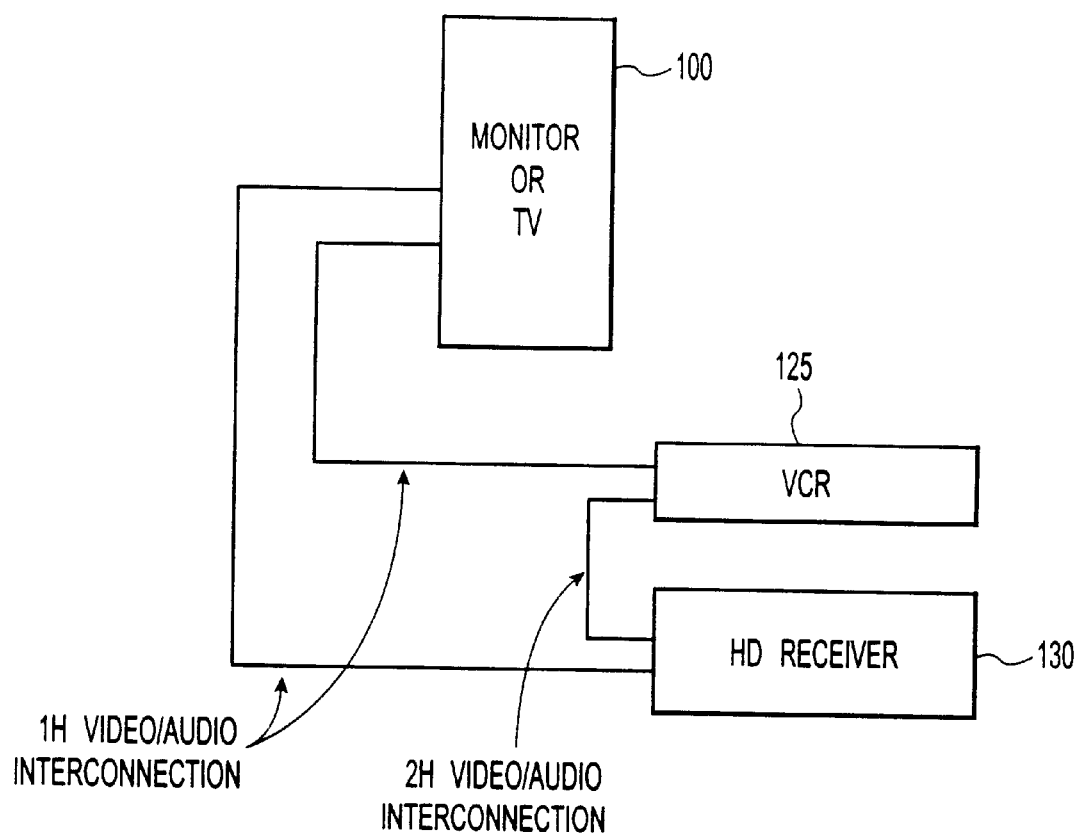
FIG. 5 shows a video system similar to the system of FIG. 3 employing the VBI ancillary data format of FIG. 1 used in another decoder configuration, according to invention principles.

FIG. 5 shows a video system similar to the system of FIG. 3 employing the VBI ancillary data format of FIG. 1 used in another decoder configuration. The FIG. 5 system includes High Definition (HD) video decoder 130, a 1 H line rate display format video monitor (e.g. TV) 100 and a 2 H line rate format VCR 125 employing the VBI ancillary data format of FIG. 1. In the FIG. 5 system, decoder 130 both communicates with and configures monitor 100, using ancillary data conveyed in the VBI of a 1 H line rate (e.g. NTSC compatible) analog composite video signal. Further, decoder 130 communicates with, and configures, VCR 125 using ancillary data conveyed in the VBI of a 2 H line rate (e.g. EIA 770.1 compatible) analog composite video signal. In an exemplary recording mode, decoder 130 provides 2 H line rate compatible analog composite video representing a high definition program to VCR 125 for recording. Decoder 110 also configures VCR 125 to record this program in 2 H line rate format. In playback mode, VCR 125 converts the recorded 2 H line rate format video to 1 H line rate format video for output to monitor 100 for display. This is performed in response to User initiation of a playback command and configuration information conveyed from decoder 130, identifying the display monitor as a 1 H format monitor. Alternatively, VCR 125 may convey the 2 H line rate video to decoder 130 for conversion by decoder 130 to 1 H line rate format and display on monitor 100. In another embodiment, VCR 125 converts the 2 H line rate format video, from decoder 130, to 1 H line rate format for recording in 1 H format in response to configuration information conveyed from decoder 130 in the VBI of the 1 H line rate signal. The recorded 1 H line rate video is output to monitor 100 for display in response to User initiation of a playback command.

The ancillary data structure of FIGS. 1 and 2 is not constrained to be conveyed in analog composite video of 1 H, 2 H or 2.14 H line rates but may be conveyed in an analog or digital video signal using any line rate. Further, the ancillary data may be used for control purposes in other system configurations not just those described in connection with FIGS. 3–5. In addition, other ancillary data structures may be derived in accordance with the principles embodied in the adaptive data recovery and multi-standard compatibility characteristics of the format of FIGS. 1 and 2.

What is claimed is:

1. A communication data format for conveying digital ancillary data in a vertical blanking interval of a video signal, comprising:
   a reference symbol including a plurality of digital pulses for indicating start of said ancillary data;
   a header following said reference symbol, containing at least one of, (a) an identifier identifying a destination service for a payload of said ancillary data, and (b) an address identifying a destination of said payload; and
   a plurality of payload bytes, following said reference symbol, for conveying said payload wherein individual bits of said ancillary data have a period substantially comprising, a first integral multiple of a first clock period associated with a first data format, and a different second integral multiple of a second clock period associated with a second data format.

2. A data format according to claim 1, wherein said ancillary data bit period is substantially equal to,
   (a) a first integer multiple of a period of a 74.25 MHz clock and
   (b) a second integer multiple of a period of an 81 MHz clock.

3. A data format according to claim 2, wherein said second integer multiple of said period of said 81 MHz clock comprises a period of a 27 MHz+/−0.5 MHz clock.

4. A data format according to claim 1, wherein said first and second data formats comprise data formats prescribed by at least two of the following standard definitions (a) EIA-770.1-A, (b) EIA-770.2-A, and (c) EIA-770.3-A.

5. A data format according to claim 1, wherein said reference symbol starts at a point in a horizontal video line that is substantially coincident with beginning of active video.

6. A data format according to claim 1, wherein said ancillary data occurs at a rate substantially equal to a horizontally line-locked clock rate to permit recovery of said ancillary data by pulse detection exclusive of prior phase locking.

7. A data format according to claim 1, wherein said ancillary data may be recovered in a decoder by both,
   (a) pulse detection exclusive of prior phase locking, and
   (b) pulse detection following prior phase locking using said reference symbol.

8. A data format according to claim 1, wherein said reference symbol comprises a half a byte "1010" bit sequence.

9. A data format according to claim 1, wherein said header is one byte in length and said payload bytes comprise two bytes.

10. A data format according to claim 1, wherein said header comprises,
    a 7 bit address field and
    a parity bit for detecting errors in at least one of, (a) said header byte, (b) said payload bytes and (c) said header and payload bytes.

11. A data format according to claim 10, wherein said 7 bit address field comprises one of, (a) a service identifier for identifying a service associated with said payload, (b) a memory address, and (c) a destination identifier for said payload.

12. A data format according to claim 1, wherein one of said payload bytes conveys, (a) a service identifier for identifying a service associated with said payload, (b) a memory address, and (c) a destination identifier for said payload, and (d) an address extension used in conjunction with an address in said header to jointly identify a destination for said remaining payload data.

13. A method for decoding a communication data format conveying digital ancillary data in a vertical blanking interval of a video signal, comprising the steps of:
    identifying a reference symbol including a plurality of digital pulses for indicating start of said ancillary data;
    capturing a header following said reference symbol, containing at least one of, (a) an identifier identifying a destination service for a payload of said ancillary data, and (b) an address identifying a destination of said payload; and
    capturing a plurality of payload bytes, following said reference symbol, for conveying said payload wherein said header and payload data are acquired using a horizontally line-locked clock having a period substantially comprising, a first integral multiple of a first clock period associated with a first data format, and a different second integral multiple of a second clock period associated with a second data format.

14. A method according to claim 13, including the step of acquiring said header and payload data by bit detection using said horizontally line-locked clock exclusively of phase locking.

15. A method according to claim 13, including the steps of
    phase locking said ancillary data to a substantially line-locked clock and
    detecting data bits in said ancillary data by sampling said data at intervals determined using said substantially line locked clock.

16. A method for forming a communication data format for conveying digital ancillary data in a vertical blanking interval of a video signal, comprising the steps of:
    creating a digital data sequence comprising
       a reference symbol comprising a "1010" bit pattern;
       a header following said reference symbol, containing at least one of, (a) an identifier identifying a destination service for a payload of said ancillary data, and (b) an address identifying a destination of said payload; and
       a plurality of payload bytes, following said reference symbol, for conveying said payload, wherein individual bits of said ancillary data have a period substantially comprising, a first integral multiple of a first clock period associated with a first data format, and a different second integral multiple of a second clock period associated with a second data format; and
    incorporating said digital data sequence within a video waveform vertical blanking interval.

17. A method according to claim 16, wherein said ancillary data bit period is substantially equal to,
    (a) a first integer multiple of a period of a 74.25 MHz clock and
    (b) a second integer multiple of a period of an 81 MHz clock.

18. A method according to claim 17, wherein said second integer multiple of said period of said 81 MHz clock substantially comprises a period of a 27 MHz clock.

19. A method for decoding a communication data format conveying digital ancillary data in a vertical blanking interval of a video signal, comprising the steps of:

identifying a reference symbol comprising a half a byte "1010" bit sequence;

capturing a header following said reference symbol, containing at least one of, (a) an identifier identifying a destination service for a payload of said ancillary data, and (b) an address identifying a destination of said payload; and capturing a plurality of payload bytes conveying said payload, following said reference symbol, wherein said header and payload data are acquired using a substantially horizontally line-locked clock.

* * * * *